United States Patent
Sheynblat et al.

(10) Patent No.: US 8,042,164 B2
(45) Date of Patent: Oct. 18, 2011

(54) DEVICE AND PROCESS FOR UNIQUE INTERNET ACCESS IDENTIFICATION

(75) Inventors: Leonid Sheynblat, Hillsborough, CA (US); Elio J. Oliva, Rockville, MD (US); Gregory G. Rose, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 940 days.

(21) Appl. No.: 11/941,756

(22) Filed: Nov. 16, 2007

(65) Prior Publication Data

US 2008/0196095 A1    Aug. 14, 2008

Related U.S. Application Data

(60) Provisional application No. 60/867,730, filed on Nov. 29, 2006, provisional application No. 60/866,248, filed on Nov. 17, 2006.

(51) Int. Cl.
    *G06F 7/04*     (2006.01)
    *G06F 15/16*    (2006.01)
    *G06F 17/30*    (2006.01)
    *H04L 29/06*    (2006.01)
    *G06Q 30/00*    (2006.01)

(52) U.S. Cl. ...... 726/9; 705/14.47; 705/14.19; 709/231; 713/193

(58) Field of Classification Search .......... None
    See application file for complete search history.

(56) References Cited

U.S. PATENT DOCUMENTS

| | | | |
|---|---|---|---|
| 5,999,912 A | 12/1999 | Wodarz et al. | |
| 6,369,754 B1 | 4/2002 | Levanon | |
| 6,920,606 B1* | 7/2005 | Jablonski et al. | 715/202 |
| 7,917,491 B1* | 3/2011 | Sack | 707/708 |
| 2004/0153365 A1* | 8/2004 | Schneider et al. | 705/14 |
| 2004/0266533 A1* | 12/2004 | Gentles et al. | 463/42 |
| 2005/0038900 A1* | 2/2005 | Krassner et al. | 709/231 |
| 2005/0273632 A1* | 12/2005 | Kawakami | 713/193 |
| 2006/0136294 A1* | 6/2006 | Linden et al. | 705/14 |
| 2006/0178918 A1* | 8/2006 | Mikurak | 705/7 |
| 2007/0073579 A1* | 3/2007 | Immorlica et al. | 705/14 |
| 2008/0114624 A1* | 5/2008 | Kitts | 705/7 |

FOREIGN PATENT DOCUMENTS

| | | | |
|---|---|---|---|
| JP | 2002142238 A | 5/2002 | |
| JP | 2008535062 A | 8/2008 | |

OTHER PUBLICATIONS

Burch, H.: "Measuring an IP Network in situ," PhD Thesis, School of Computer Science, Carnegie Mellon University, Pittsburgh, PA 15213, CMU-CS-05-132, Published May 6, 2005, Retrieved on Oct. 7, 2008.
International Search Report-PCT/US2007/085004, International Searching Authority/US-Alexandria, Virginia-Oct. 15, 2008.
Written Opinion-PCT/US2007/085004, International Searching Authority/US-Alexandria, Virginia-Oct. 15, 2008.

* cited by examiner

*Primary Examiner* — Shin-Hon Chen
(74) *Attorney, Agent, or Firm* — Linda G. Gunderson (57) ABSTRACT

A process and device for uniquely identifying an Internet enabled device with a unique identification. The process can include receiving an identification when an Internet user accesses an Internet resource, and determining position-based information for at least one of an Internet user and an Internet enabled device based on the identification. The identification may be authenticated, to reduce fraud. The identification may further be used to determine whether or not the device is in a particular geographic area of interest.

53 Claims, 4 Drawing Sheets

DEVICE AND PROCESS FOR UNIQUE INTERNET ACCESS IDENTIFICATION

CROSS-REFERENCE TO RELATED APPLICATIONS

This application claims priority under 35 U.S.C. §119(e) to provisional U.S. Patent Application No. 60/866,248, filed on Nov. 17, 2006 and provisional U.S. Patent Application No. 60/867,730, filed on Nov. 29, 2006, the disclosures of which are expressly incorporated by reference herein in their entirety.

BACKGROUND

1. Field

The device and process is in general directed to unique Internet access identification.

2. Related Art

Internet advertising has become a multibillion dollar industry allowing various advertisers to provide directed advertisements to websites and search engines at minimal cost. The cost of such advertisement is typically based on the number of clicks an advertisement receives from various World Wide Web (www) Internet Users. Accordingly, an Internet advertiser typically pays for the advertisements in a per use or "pay-per-click" manner. In other words, when an Internet user selects or "clicks" an Internet advertisement, the advertiser is charged.

The Internet advertiser can typically provide the advertisements in a number of different ways. In one way, the Internet advertising can be generated by a search engine when an Internet User makes a search based on a particular set of key words or the like. The Internet advertiser can typically provide their advertisements to the search engine webpage thus providing the Internet User with an advertisement based on the search criteria.

A second way in which an Internet advertiser may provide their advertisement to Internet Users is to associate or embed their advertisement into a typical third party or non-search engine based webpage. In both of these cases, when the Internet User clicks on the Internet advertisement provided by the Internet advertiser, the Internet advertiser is typically charged a certain fee for the click.

Unfortunately the Internet advertising industry has been subject to a number of different types of fraud. One type of fraud is created when a user or an automated robotic computer fraudulently clicks an Internet advertisement. This clicking is not based on any interest in the Internet advertiser's advertisement, however the Internet advertiser is still typically subject to the pay-per-click cost generated when this fraudulent click is made to their Internet advertisement. The fraudulent clicks can be generated from those various individuals that will benefit from the pay-per-click cost to the Internet advertiser. These individuals include those that host the Internet advertisement, competitors that benefit from the advertiser losing money on advertising, and the like. For example various competitors of the advertisers may wish to harm the competitor who is providing Internet advertising in the same market. The harm could come by clicking on their Internet advertisements to run up the advertising cost to the Internet advertiser. This will typically weaken or eliminate the source of competition for this particular individual. In any event, no matter what the source of the fraudulent click to the Internet advertiser, the Internet advertiser ends up paying the cost for Internet advertisement that is not provided to an interested Internet user.

Another type of Internet advertising fraud is impression fraud. Impression fraud is the repeated loading of and reloading of a search engine page or web page having an advertisement. When repeatedly loading the webpage advertisement and not clicking on the webpage advertisement, the advertisement will appear to be a non-performing webpage advertisement. Accordingly because the webpage is non-performing, the search engine or web master will have a tendency to drop it.

A number of search engines have tried to reduce the amount of fraudulent clicks by employing various technologies or fraud filters. For example, at least one search engine has created algorithms that sift through the clicks to find patterns suggesting fraud. Once fraud is determined, they disregard the fraudulent clicks without regard to the source or motive of the clicks. One such way in which to determine fraudulent clicks is to ascertain a time and IP address from the source of the click. For example, an Internet advertiser may host a webpage advertisement in another webpage. This webpage advertisement will typically have its own very long Universal Resource Locator (URL). This URL is typically embedded with a string of information that includes the current time (in milliseconds), the last time the host webpage was updated (also in milliseconds), and various other data to track an Internet User behavior. Thereafter, the search engine may review this information to ascertain whether or not a particular Internet User has clicked on the same advertisement more than once. If the same Internet User has clicked on the advertisement multiple times, then the advertisement will only be considered to have received a single click. Another approach is to look for telltale behavior including proxy servers and clicks coming from geographic areas not likely to have customers. However, this information is typically very difficult to obtain.

These various approaches to reducing fraudulent clicks have been less than satisfactory. In particular, fraudulent clicks still make up a large percentage of the clicks that are received by typical advertisers.

Further, an Internet User on the World Wide Web is typically given Internet advertising that is not relevant to their geography. This is because a typical Internet User browses the Web in a manner such that no one knows their geographic location. Accordingly, local advertisers are typically not interested in providing any type of local advertisement on the World Wide Web as they rightfully believe that the majority of individuals will not typically be relevant to their advertising as they are out of the geographic location that could benefit them through their advertising. There is no solution to geographic locating of Internet Users that is satisfactory for dealing with the above-noted issue.

Accordingly, there is a need to uniquely identify an Internet User in order to determine that they are indeed a legitimate consumer for Internet advertising, and there is a further need to determine the geographic location of an Internet User in order to better direct geographic specific advertising to the Internet User.

SUMMARY

The device and process meets the foregoing need and avoids the disadvantages and drawbacks of the prior art by providing a device and process to determine the validity or invalidity of an Internet user/device by identifying the geographic origin of an Internet enabled device. The device and process further meets the foregoing needs and avoids the disadvantages and drawbacks of the prior art by determining the geographic location of the Internet User in order to generate and provide the Internet User with geographic-based Internet advertising that will be significant to the Internet User and other advantages apparent from the discussion herein.

Accordingly, a process for uniquely identifying an Internet enabled device with a unique identification, includes the steps of receiving an identification when an Internet user/device accesses an Internet resource (such as an advertisement, an object returned as a result of a search using a search engine, or any type of Internet resource), determining position-based information for at least one of an Internet user and an Internet enabled device based the identification, wherein the identification may be based on the position-based information, and one of tailoring Internet advertising based on a geographic location provided by the position-based information and determining the legitimacy of the Internet user based on the position-based information.

The position-based information may be based on at least one of satellite positioning signals, wireless network location, IP address location, and proxy server location. The identification may be further based on at least one of time-based information, Internet enabled device movement, IP address information, and Internet enabled device identification. The identification further may include an abstraction layer to the identification. The identification further may include encryption. The encrypted identification may be configured to be decrypted by a targeted Internet resource with a secondary key. The process may further include the steps of storing encryption information related to the identification, and performing encryption operations with respect to the identification.

The Internet resource may include at least one of a resource associated with a search engine and a resource associated with a web provider. For example, an Internet resource may be an advertisement, and selection of the resource (e.g., by clicking on an icon representative of the resource presented in a user interface, or by machine-generated selection of the resource at the Internet enabled device) acts as a request for a service provider associated with the resource to perform one or more acts based on the selection. The acts may include transmitting additional information (e.g., transmitting information to display an informational screen related to the goods or services being advertised on the user interface), processing the selection (e.g., processing an order for goods or services based on a "click" of an icon offering the goods or services to a user), or other act.

Another aspect is directed to a process for uniquely identifying an Internet user with a unique identification which includes the steps of determining position-based information for at least one of an Internet user and an Internet enabled device, generating an identification based on the position-based information, and sending the identification to a server associated with an Internet provider when an Internet user selects the Internet resource.

The step of determining may include determining a geographic position based on at least one of satellite positioning signals, wireless network location, IP address location, and proxy server location. The identification may be further based on at least one of time-based information, Internet enabled device movement, IP address information, and Internet enabled device identification. The step of generating the identification may be based on the position-based information and further may include adding an abstraction layer to the identification. The step of generating the identification may be based on the position-based information and further may include encrypting the identification. The step of generating may include storing encryption information related to the identification, and performing encryption operations with respect to the identification. The encrypted identification may be configured to be decrypted by an entity associated with the targeted Internet resource with a secondary key. The entity associated with the targeted Internet resource may include at least one of a search engine and a web provider.

In yet another aspect a device to uniquely identify an Internet user with a unique identification includes a circuit to determine position-based information for at least one of an Internet user and an Internet enabled device, a circuit to generate an identification based on the position-based information, and a circuit to send the identification to an Internet resource when an Internet user accesses the Internet resource.

The circuit to determine position-based information may determine a geographic position based on at least one of satellite positioning signals, wireless network location, IP address location, and proxy server location. The identification may be further based on at least one of time-based information, Internet enabled device movement, IP address information, and Internet enabled device identification. The identification further may include an abstraction layer. The identification may be encrypted. The encrypted identification may be configured to be decrypted by an entity associated with the targeted Internet resource with a secondary key. The device further may include a storage to store encryption information related to the identification, and a processor to perform encryption operations with respect to the identification. The Internet resource may be associated with a service provider including at least one of a search engine provider and a web provider.

In a further aspect, a machine-readable medium includes instructions, which, when executed by a processor cause the processor to uniquely identify an Internet user, the machine-readable medium includes instructions for determining position-based information for at least one of an Internet user and an Internet enabled device, instructions for generating an identification based on the position-based information, and instructions for sending the identification to an entity associated with an Internet resource when an Internet user selects the Internet resource.

The instructions for determining may include instructions for determining a geographic position based on at least one of satellite positioning signals, wireless network location, IP address location, and proxy server location. The identification may be further based on at least one of time-based information, Internet enabled device movement, IP address information, and Internet enabled device identification. The instructions for generating the identification based on the position-based information further may include instructions for adding an abstraction layer to the identification. The instructions for generating the identification based on the position-based information may include instructions for encrypting the identification. The encrypted identification may be configured to be decrypted by an entity associated with a targeted Internet resource with a secondary key. The instructions for generating may further include instructions for storing encryption information related to the identification, and instructions for performing encryption operations with respect to the identification. The Internet resource may be associated with a service provider including at least one of a search engine provider and a web provider.

In a further aspect, a device to uniquely identify an Internet user with a unique identification includes means for determining position-based information for at least one of an Internet user and an Internet enabled device, means for generating an identification based on the position-based information, and means for sending the identification to an Internet resource when an Internet user accesses the Internet resource.

The determining means may determine a geographic position based on at least one of satellite positioning signals, wireless network location, IP address location, and proxy server location. The identification may be further based on at least one of time-based information, Internet enabled device movement, IP address information, and Internet enabled device identification. The identification may further include an abstraction layer. The identification may be encrypted. The encrypted identification may be configured to be decrypted by a targeted Internet resource with a secondary key. The device may include a storage to store encryption information related to the identification, and a processor to perform encryption operations with respect to the identification. The Internet resource may be associated with a service provider including at least one of a search engine provider and a web provider.

In general, in another aspect, an internet enabled device may include a hardware-coded unique device identifier. The device may further include control logic to perform operations comprising receiving an indication of a selection of a particular Internet resource and, in response to receiving the indication of the selection of the particular internet resource, transmitting information indicative of the unique device identifier and information indicative of the selection of the particular internet resource. The information indicative of the selection of the particular internet resource may be indicative of a Uniform Resource Locator (URL) associated with the internet resource. The control logic may be implemented as software instructions stored in a tangible medium such as memory, to be executed by a processor module, may be implemented as hardware, may be implemented as firmware, or may be implemented in some combination.

The operations may further be include determining information indicative of the position of the Internet enabled device, and transmitting the information indicative of the position of the Internet enabled device. The information indicative of the position of the Internet enabled device may be included in the unique identifier or may be transmitted as information separate from the unique identifier. In some implementations, the hardware-coded unique device identifier comprises a hardware-coded key. The operations may further comprise encrypting the hardware-coded unique device identifier.

In some aspects, the operations further comprise determining information indicative of a selection time associated with selection of the Internet resource, and transmitting the information indicative of the selection time. The selection time information may be part of a unique click identifier (UCI) including information related to the device identifier, and additional parameters (such as selection time), or the device identifier information may be separate from at least some of the information related to the additional parameters. The device may include one or more motion sensors configured to generate information indicative of motion of the Internet enabled device, which may be transmitted by the device.

In general, in another aspect, an Internet system may include a receiver to receive information indicative of a unique identifier of an Internet enabled device in response to a selection of an Internet resource at the Internet enabled device, wherein the information indicative of the unique identifier is generated using a hardware-coded identifier of the Internet enabled device, and control logic configured to perform operations comprising processing the information indicative of the unique identifier and determining if the selection of the Internet resource is authenticated based on the processing the information indicative of the unique identifier. Processing the information indicative of the unique identifier may include decrypting the information indicative of the unique identifier with a locally stored cryptographic key. The system may include one Internet device such as a server, or may include a plurality of devices, which may be operated by a single service provider or more than one service provider.

The operations may further comprise, if the selection of the Internet resource is authenticated, generating an indication that the selection of the Internet resource is a valid click. The operations may further comprise, if the selection of the Internet resource is not authenticated, generating an indication that the selection of the Internet resource is an invalid click. The operations may further comprise, if the selection of the Internet resource is not authenticated, indicating that the selection of the Internet resource is provisionally an invalid click. If a selection is indicated as a provisionally invalid click, the system may perform further actions in an attempt to ascertain whether the selection is valid (for example, transmitting information to prompt a user to enter additional information to be used for authentication).

In some aspects, the system may receive location information associated with a location of the Internet-enabled device, and wherein the operations may further comprise comparing the location of the Internet-enabled device to a geographical area of applicability for the Internet resource and, if the location of the Internet-enabled device is included in the geographical area of applicability for the Internet resource, designating the selection of the Internet resource as a valid click associated with the Internet resource. Designating the selection of the Internet resource as a valid click may comprise counting the click. The location information may be based on at least one of satellite positioning signals, wireless network location, IP address location, and proxy server location The system may receive information having at least one information type selected from the group consisting of time information associated with a time of the selection of the Internet resource, information indicative of Internet enabled device movement, and information indicative of IP address of the Internet enabled device. The information indicative of a unique identifier may include abstracted information. In some aspects, the information indicative of a unique identifier includes encrypted information encrypted with a first hardware-included key, and the system may include a second locally stored key is configured to decrypt information encrypted with the first key. The Internet resource may comprise an advertisement, and the system may further include a server associated with a service provider hosting the advertisement. The control logic may be included in the server.

Additional features, advantages, and embodiments of the device and process may be set forth or apparent from consideration of the following detailed description, drawings, and claims. Moreover, it is to be understood that both the foregoing summary and the following detailed description are exemplary and intended to provide further explanation without limiting the scope of the device and process as claimed.

BRIEF DESCRIPTION OF THE DRAWINGS

The accompanying drawings, which are included to provide a further understanding of the device and process, are incorporated in and constitute a part of this specification, illustrate embodiments of the device and process and together with the detailed description serve to explain the principles of the device and process. No attempt is made to show structural details of the device and process in more detail than may be necessary for a fundamental understanding of the device and process and the various ways in which it may be practiced. In the drawings.

DETAILED DESCRIPTION

The embodiments of the device and process and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the device and process. The examples used herein are intended merely to facilitate an understanding of ways in which the device and process may be practiced and to further enable those of skill in the art to practice the embodiments of the device and process. Accordingly, the examples and embodiments herein should not be construed as limiting the scope of the device and process, which is defined solely by the appended claims and applicable law. Moreover, it is noted that like reference numerals represent similar parts throughout the several views of the drawings.

The process and device allow an Internet advertiser, search engine, and so on to determine and securely identify an Internet-enabled device selecting a particular Internet resource (such as an advertisement offered by the advertiser or search engine). This identification process is the determination that a user is not acting fraudulently. This process may be considered authentication. The process and device can rely on various types of positioning capabilities that may be introduced into a web browser, an Internet enabled device, a mobile station and so on. As a result of the capabilities of such positioning techniques, the Internet User may browse various Internet resources such as websites including Internet based advertising, and the position-based information may be used by the Internet search engine, Internet advertiser, and so on to reduce fraud and to geographically tailor advertising.

Figure 1:
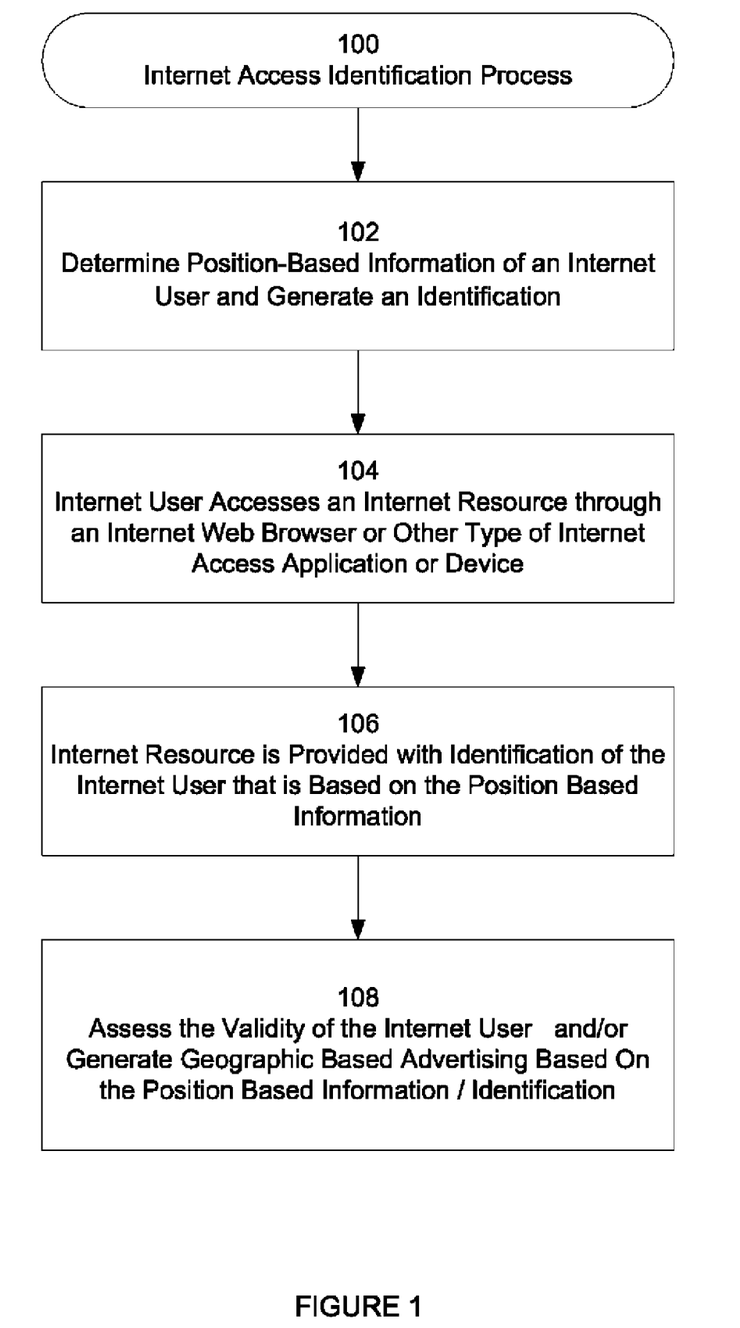
FIG. 1 is a flow chart showing the Internet access identification process.

Shown in FIG. 1 is a flow chart showing the Internet access identification process 100. As described in greater detail below, an Internet enabled device may include a positioning capability to determine the actual or approximate position of the Internet enabled device within a geographic area. In step 102, as shown in FIG. 1, an initial step is to determine position-based information of an Internet enabled device that may be used to access the Internet by an Internet user. This information and the time it is determined may be processed and saved by the Internet enabled device for identification use. In particular, the information may be used to generate a unique identification.

Note that the identification is unique to the Internet enabled device, but may be the same for subsequent "clicks" (selections of one or more Internet resources). For example, a first identification may be transmitted in response to a first click. Depending on the parameters used for the identification, the same identification may be transmitted in response to a second click (of the same or different Internet resource).

Next, the Internet user may access a particular webpage or other Internet resource as shown in 104, as is well known in the art, through an Internet web browser or other type of Internet access application on an Internet enabled device, mobile station, or the like. The selection of an Internet resource may be referred to in general as a "click." Herein, the term "click" applies to selection of an Internet resource by a person, and machine-implemented selection of an Internet resource. As known in the art, a click is usually generated in response to a user clicking or otherwise selecting on a user-interface presentation of a representation of the Internet resource, but sometimes accomplished using a machine-implemented click generation technique that can be used for click fraud.

As shown in step 106, in response to the Internet user selecting the Internet resource, the Internet enabled device may provide the Internet resource with an identification that is unique to the Internet enabled device, and that may include the position-based information determined in step 102. Additionally, the time the information was determined may also be provided. Next, as shown in step 108, the Internet resource may then assess the validity and/or geographic location of the Internet User based on the position-based information in order to determine any one or more of a geographic location thereof, the legitimacy of the Internet user, the legitimacy of the Internet click therefrom, and so on.

Note that in some implementations, the Internet enabled device may transmit the same identification information for subsequent selections of an Internet resource, or the identification information may be different for each click. For example, if the identification information includes time information, and time is measured in small enough intervals that a different time corresponds to each click, the identification information can be different for every click. However, if the identification information includes information that doesn't necessarily change between clicks, the transmitted identification information can be the same for subsequent clicks.

The unique identifier may be used in many ways. In an example, an Internet user may click on a representation of a particular Internet resource using an Internet enabled device. In response to the selection of the Internet resource, the Internet enabled device transmits information indicative of a unique identifier (referred to as a "unique click identifier" or UCI). The unique identifier information is received at an entity configured to process the identifier and take one or more actions depending on the outcome of the processing.

For example, the entity may be a first server that performs authentication of user clicks prior to processing the selection of the Internet resource(s). If the first server authenticates the click, the selection of the Internet resource may be processed. For example, if the authenticated selection were a click on an icon for an Internet advertisement, the server may count the click and subsequently transmit additional information related to the advertisement to the Internet device.

However, if the first server is unable to authenticate the selection, the user may not be allowed to access the Internet resource at all, or may be required to perform one or more further actions before access is allowed (such as typing a set of characters, manually entering additional identification information, or other actions). As a result, impression fraud and/or click fraud may be significantly reduced. Because the unique device identifier is not vulnerable to easy spoofing (the way IP address may be spoofed), current techniques may be significantly more effective than existing techniques.

The authentication may also be used as part of a process to curtail fraudulent access, even when an Internet device is properly authenticated with the first server. In an example, the click pattern of a properly authenticated Internet device may be analyzed to determine whether impression fraud, click fraud, or other improper use is indicated. If so, the Internet device may not be allowed to access the Internet resource with subsequent click events, or other action may be taken. This technique provides a significant value beyond available techniques, since the Internet device in question has an authenticated identification, and thus may not use current techniques (such as IP address spoofing) to avoid detection by click pattern analysis.

Figure 2:
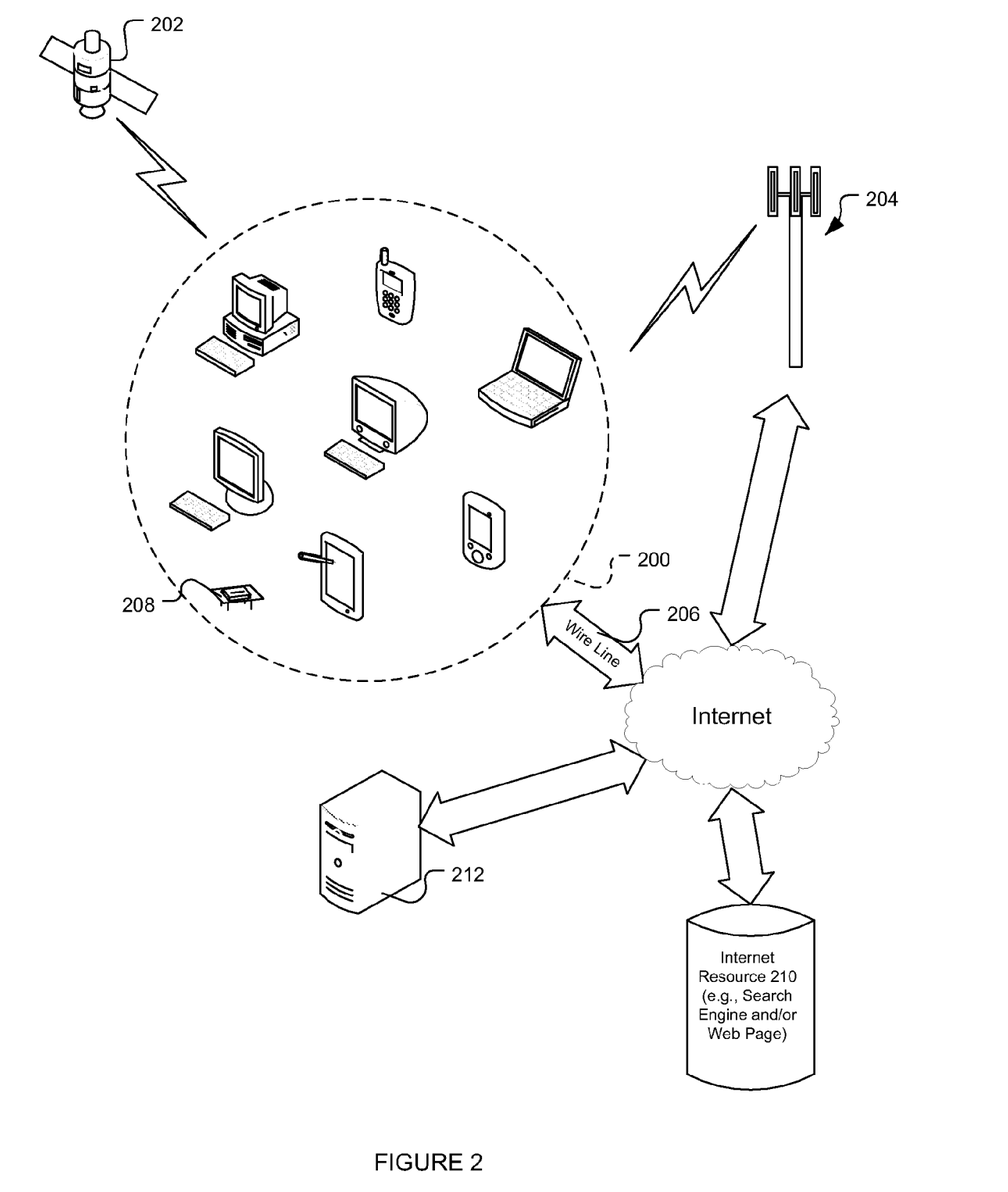
FIG. 2 is a schematic showing various Internet enabled devices interacting with various networks.

FIG. 2 is a schematic showing the Internet enabled device 200 and its relationship to various other components including the Internet. In particular, an Internet user may use an Internet enabled device 200 including one or more of a laptop computer, PC, Mac-based computer, a mobile station, tablet PC, PDA, iPhone and so on to access the Internet. As noted above, Internet enabled device 200 may implement one or more positioning techniques, and may transmit unique identification information that includes information indicative of its position as part of the UCI information.

The Internet enabled device 200 may be configured such that it receives satellite positioning signals (SPS) such as from a satellite 202. The Internet enabled device 200 may be configured to include the ability to receive satellite positioning signals from the satellite 202 and to process the signals in order to determine the location of the Internet enabled device 200.

Alternatively or additionally, the Internet enabled device 200 may include the ability to connect wirelessly to a wireless system 204. A wireless system 204 may be any type of wireless technology including CDMA, TDMA, GSM, (O)FDMA, wireless wide area networks (WWAN), wireless broad band (EV-DO) and so on. Internet enabled device 200 may receiving positioning information using the wireless connection; for example, may receive assistance data in an Assisted Global Positioning System (AGPS) implementation, may receive signals for a terrestrial positioning implementation (such as an Advanced Forward Link Trilateration (AFLT) or other terrestrial time delay-based positioning system), or some combination (e.g., a hybrid system).

Alternatively or additionally, the Internet enabled device 200 may connect to the Internet through a wired Internet connection 206 including local area networks (LAN) or personal area networks (PAN) that may include a wireless fidelity (WiFi) deployment. The wired Internet connection 206 may be capable of providing a web server proxy or other type of identifying information to the Internet enabled device 200. Internet enabled device 200 may receive positioning information from the wired Internet connection 206.

The Internet enabled device 200 may further determine various changes in position using one or more positioning techniques, and/or with an internal motion device 208. The internal motion device 208 may be any type of sensor such as an accelerometer or other type of motion sensing device as is well known in the art.

Positioning information may provide additional benefits to those provided by unique device identifiers. As an example, when a click on an advertisement (a selection of a particular Internet resource, which may be accomplished by a person or may be machine implemented) takes place, the Internet device may transmit a unique identifier including information indicative of the device position. The identifier may be received by an entity such as a first server, which may perform one or more acts using the identifier. For example, a geographic area of applicability associated with the advertisement may be retrieved either from a local data base or remote server 212. Next, a position event takes place which determines the location of a click (e.g., the entity uses information indicative of the position of the Internet enabled device to determine or otherwise ascertain the location of the Internet enabled device). If the resultant position lies within the boundaries of the geographic area of applicability, the "click" may be identified as valid or relevant and may be sent forward to an "advertisement" server. In the case when the position is outside of the geographic area, the click may be identified as invalid and can be either filtered out and ignored or forwarded to the advertisement server with an indication of invalidity "outside of geographic area" condition indicator. In some implementations, the determination that the position is not included in the geographic area of applicability is used only to determine whether or not a particular click is counted, and information regarding the advertisement is transmitted to the selecting entity in response to the click.

In other implementations, the "geographical area of applicability" may be used to filter unwanted click traffic since it may be either generated by fraudulent behavior or may not apply to the information being advertised or targeted service. In such an implementation, the click may not result in information associated with the advertisement being transmitted to the Internet enabled device for presentation to the user.

In one implementation, Internet enabled device 200 includes one or more hardware modules with a hardware-coded unique device identifier. Device 200 further includes control logic, which may be implemented as instructions stored on a memory to be executed by a processor module. The control logic may be implemented as firmware, hardware, or some combination of software, firmware, and hardware.

Device 200 may include a display to display a user interface that includes a representation of an Internet resource such as an icon for an advertisement or other resource. Device 200 may include a selection device to allow a user to select the Internet resource by clicking on the representation (e.g., using a mouse or track ball), touching the representation (e.g., using a touch screen), or otherwise allow the selection of the Internet resource. Device 200 may be include control logic to select an Internet resource without a user selecting the resource; for example, software to repetitively select the Internet resource in order to perpetrate click fraud or for other fraudulent use.

The control logic of device 200 may be used to access the hard-coded identifier to generate an identifier to be sent to a service provider entity in response to a selection of an Internet resource associated with an Internet resource. This identifier may be referred to as a unique click identifier or UCI. The UCI may include only information indicative of the hard-coded identifier, or may include information of additional parameters such as selection time, device position, device motion, and the like.

Device 200 may transmit the UCI to an entity associated with the selected Internet resource, such as a service provider server 210. At server 210, the UCI may be processed to authenticate the selection of the Internet resource. Server 210 may include a receiver (such as a wireless interface, wired interface, and the like) to receive the UCI and to perform authentication. In some implementations, the UCI is encrypted, and server 210 is able to access a corresponding key to decrypt the UCI and authenticate the selection using the decrypted information. Server 210 (and/or a different entity associated with the selected Internet resource) can also use position information from device 200 to determine whether the selection is a valid click. For example, server 210 may compare the location of device 200 to a geographic area of applicability of the Internet resource, and only determine that the selection is a valid click if the location is included in the geographic area of applicability.

Figure 3:
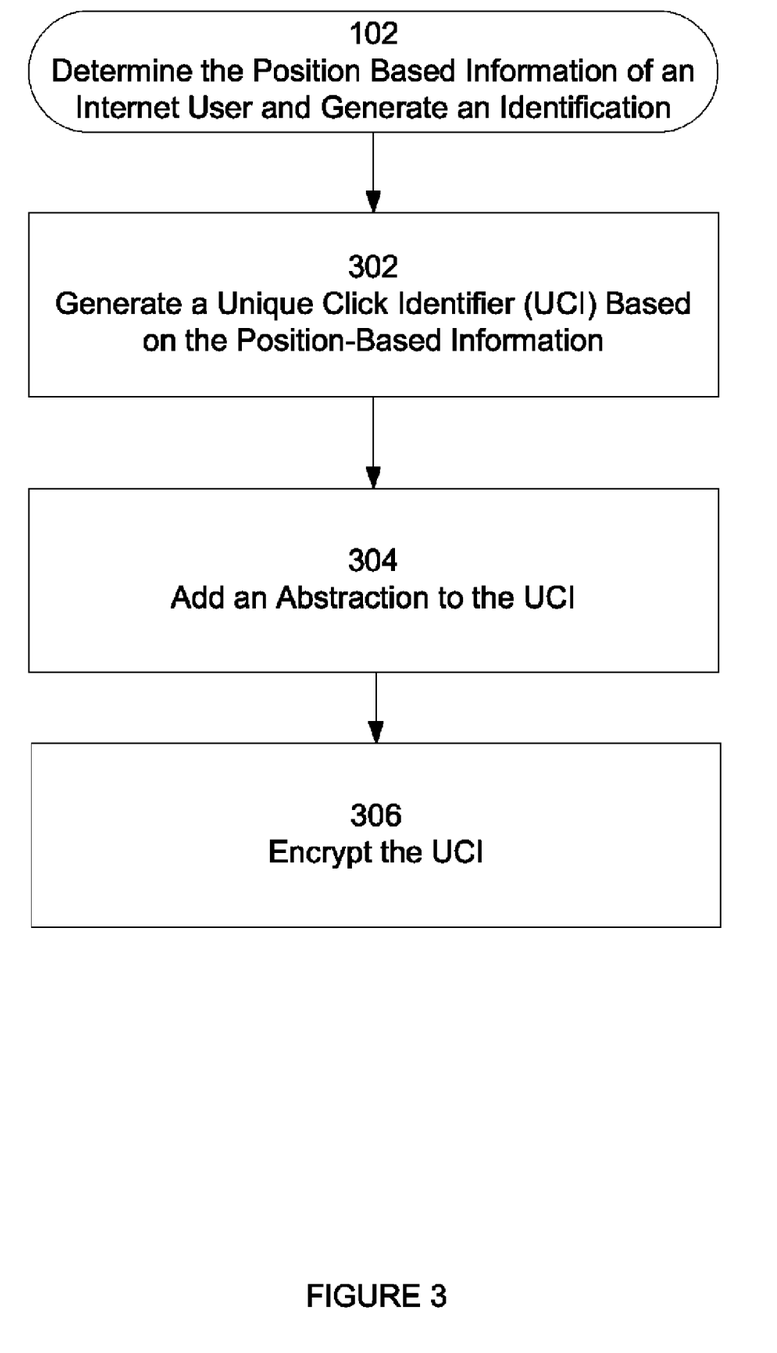
FIG. 3 is a flow chart showing the generation of the identification information.

FIG. 3 shows an exemplary detailed implementation of the determination of position-based information and unique identification generation 102 shown in FIG. 1. More specifically, the FIG. 3 implementation shows the generation of an example UCI. The UCI may be used to forward information indicative of a unique identifier for the Internet enabled device, and optionally one or more of position-based information, time information, and other desired information to the selected Internet resource in conjunction with step 106 noted in FIG. 1. In some implementations, the UCI includes information indicative of the unique identifier, and other information is transmitted separately from the UCI. In the implementation shown in 302, the position-based information, the time the position information is determined, and any other pertinent information may be used to determine the UCI with a UCI algorithm that is discussed in greater detail below.

The UCI algorithm may be based on one or more of the time information determined from various sources including the position determining sources. These can include the timing signals from SPS signals described above or timing signals from any other infrastructure. For example, Network Time Protocol (NTP) servers may provide precision timing for such a purpose. Additionally, the UCI algorithm may be based on the geographic location determined as noted above, the geographic location being based on one or more of the SPS signals, the location of the various wireless type systems, or the location of the wired web server proxy devices. Of course it should be noted that any type of position determination is within the spirit and scope hereof.

Next, the UCI algorithm may use information based in part on the movement of the Internet enabled device. In this regard, the internal motion sensing device 208 may provide information indicative of changes in the relative positioning of the Internet enabled device 200. In some implementations, when the internal motion sensing device 208 determines that movement of the Internet enabled device 200 exceeds a particular threshold, the position calculation may again be executed and the position determined in order to update the position information associated with the Internet enabled device 200.

Additionally, the UCI algorithm may be based in part on the IP address. In this regard, the particular IP address of the Internet enabled device 200 may form part of the calculation of the UCI. Moreover, the IP address may be used when other positioning signals are not available.

The Internet enabled device 200 may include some form of unique product identifier. The UCI may be generated, in part, to include this unique product identifier. In one such implementation the unique product identifier may include a master key for user authentication; for example, a 128 bit number (although many implementations are possible). The unique product identifier may be hardware-coded, to increase the security of the solution.

Because identification may include information on a geographical area of applicability, the Internet advertiser, such as a search engine server 210, may be able to obtain information and provide appropriate Internet advertisement accordingly. Note that search engine server 210 is associated with an Internet resource, such as a particular advertisement offered in response to a search using particular key words, as is known in the art. The Internet advertiser may be able to select the resolution of the geographic area, the geographic area resolution ranging from a very large area, such as a country or state, to a smaller area, such as city blocks and the like. Accordingly, the Internet advertiser and/or search engine server 210 may then use this geographic area information to send the appropriate tailored advertisement to the Internet user. Additionally, this particular geographic information may also be useful in order to validate the legitimacy of the Internet user and the associated click to Internet advertising as set forth in conjunction with step 108.

Next, as shown in step 304 of FIG. 3, the UCI may include an abstraction. In this regard the UCI algorithm may contain an abstraction layer that may hide the actual location information of the Internet enabled device 200. The abstraction layer may have a default mode of operation being in the activated mode. Accordingly, if the Internet user wants to convey their location information to the search engine provider, they must actively decide to do so and adjust the settings of the UCI algorithm accordingly.

Next as shown in step 306, the UCI may optimally include a step of encryption. Prior to the position-based information being forwarded to an Internet resource, the UCI may be encrypted and sent to the search engine or Internet advertiser along with the selection of the Internet resource such as a click. This encryption method may be software and/or hardware based. The UCI encryption and authentication may use any suitable cryptographic encryption and message authentication algorithm. Such encryption may be based on an Internet user's specific key, the Internet enabled device's specific key and so on. A standard method such as a CCM mode specified in the National Institute of Science and Technology (NIST) Special Publication-800-38C may be suitable for this encryption process.

Finally, the UCI may be transferred to the search engine and/or Internet advertiser 210 from the Internet enabled device 200 or a server that is implemented for such purpose.

The above noted UCI algorithm may reside at least partially in a physical hardware module that may contain a hardware-included unique identification or master key. For example, the hardware may be a Mobile Station Modem (MSM). This unique identification or master key may be used with the above noted encryption process. Moreover, this unique identification may also be supplemented with unique identification information from a Subscriber Identity Module (SIM) or other external type of component that may provide secure identification information.

In one implementation, a generated UCI tag may include information indicative of time, location, and optionally movement (e.g., using sensors) to uniquely identify a given click. This tag may then be fed through an abstraction layer and encrypted using a hard-coded key (e.g., an MSM's internal hardware key). The tag information may then be transmitted and processed as a cookie by service providers who may then use the tag information to authenticate a click. However, as noted above, position, time, motion, or other information may be separate from the UCI tag in some implementations.

The encryption algorithm can leverage an RNG (random number generator) methodology (secure MSM) to generate a secondary key derived from the master key. Multiple secondary keys may be given or sold to service providers such as Google, who may be interested in click authentication. In some implementations, there may be no need to mutually authenticate or pass keys between the device (e.g., MSM) and the service provider. This may provide the benefit that the UCI exchange is fast and unobtrusive.

Figure 4:
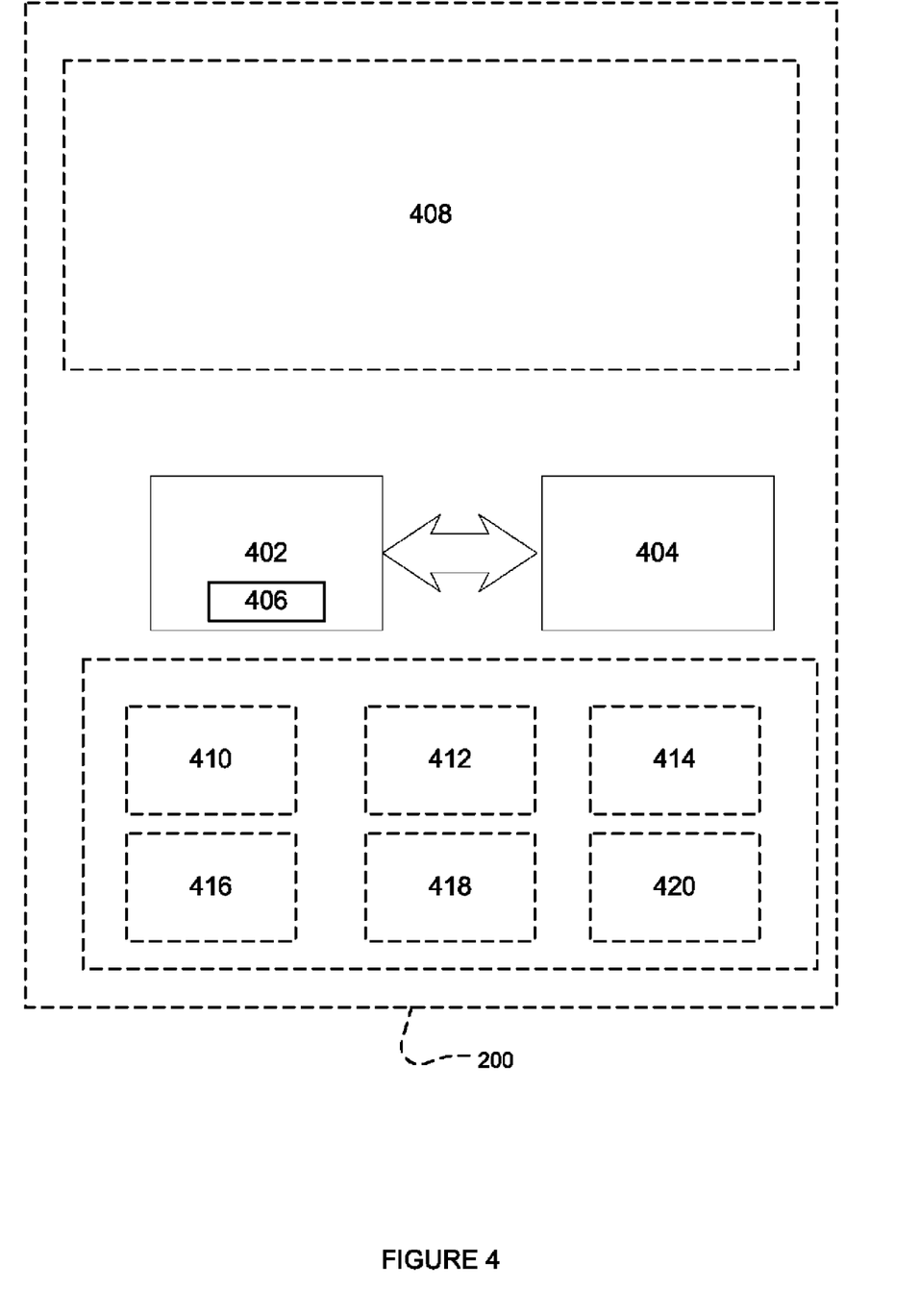
FIG. 4 is a schematic of the hardware of an Internet enabled device.

FIG. 4 is a partial schematic of the exemplary hardware of an Internet enabled device. In particular, the Internet enabled device 200 may include secured hardware 402. The secured hardware 402 may be any type of storage such as a SIM. Moreover, the secured hardware 402 may be used to store cryptographic information 406. The cryptographic information may include cryptographic keys. The Internet enabled device 200 may further include a separate secured hardware processor 404. The separate secured hardware processor 404 may be used for encryption operations and/or authentication processing. The Internet enabled device may also include a display 408, and inputs 410, 412, 414, 416, 418, 420 providing display and input functionality, respectively, as is well known in the art.

The UCI encryption may be implemented such that it forms a pseudo-random sequence that may only be decrypted by a search engine provider, such encryption making the UCI more resistant to "man-in-the-middle" or other type of fraudulent attacks. Additionally, the encryption algorithm itself may also be hardware encoded in a module to further ensure its security. Such an encryption algorithm may also generate a secondary key unique to a targeted search engine provider. Accordingly, these assigned secondary keys may be provided to the search engine providers for user authentication and decryption purposes and the like to limit access to the identification information to the targeted search engine provider. There may be a plurality of such secondary keys and these may licensed to search engines and the like.

The position determination techniques may include signal processing and acquisition and may be used for various wireless communication networks 204 such as those associated shown in FIG. 2 for use with various mobile stations 200, such as a wireless wide area network (WWAN), a wireless local area network (WLAN), a wireless personal area network (WPAN), and so on. As used herein, mobile station (MS) refers to a device such as a cellular telephone, wireless communication device, user equipment, other personal communication system (PCS) device, a position determination device employing position determination techniques or the like. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

As further shown in FIG. 2, an Internet enabled device 200 may receive signals from satellite(s) 202, which may be from a Global Positioning System (GPS), Galileo, GLONASS, NAVSTAR, GNSS, a system that uses satellites from a combination of these systems, or any Satellite Positioning System (SPS) developed in the future, each referred to generally herein as a SPS. As used herein, an SPS will also be understood to include pseudolite systems.

The device and process described herein may be used with various SPS, such as the United States Global Positioning System (GPS), the Russian Glonass system, the European Galileo system, any system that uses satellites from a combination of satellite systems, or any satellite system developed in the future. Furthermore, the disclosed methods and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite" as used herein, is intended to include pseudolites, equivalents of pseudolites, and possibly others. The term "SPS signals" as used herein is intended to include SPS-like signals from pseudolites or equivalents of pseudolites.

The methodologies described herein may be implemented by various means depending upon the application. For example, control logic to implement these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station 200, and executed by a processor, for example a general-purpose processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

While the device and process has been described in terms of exemplary embodiments, those skilled in the art will recognize that the device and process can be practiced with modifications in the spirit and scope of the appended claims. These examples given above are merely illustrative and are not meant to be an exhaustive list of all possible designs, embodiments, applications or modifications of the device and process.

What is claimed:

1. An Internet enabled device, comprising:
   control logic to:
   process a received indication of a selection of a particular Internet advertisement; and
   initiate transmission via communication network, in response to receiving the indication of the selection of the particular Internet advertisement, information indicative of a unique device identifier of the Internet enabled device, a geographical location of the Internet enabled device, and information indicative of the selection of the particular Internet advertisement.

2. The Internet enabled device of claim 1, wherein the unique device identifier comprises a hardware-coded key.

3. The Internet enabled device of claim 1, wherein the control logic is further adapted to encrypt the unique device identifier.

4. The Internet enabled device of claim 1, wherein the control logic is further adapted to:
   determine information indicative of a selection time associated with the selection of the Internet advertisement; and
   initiate transmission of the information indicative of the selection time.

5. The Internet enabled device of claim 1, further comprising one or more physical motion sensors configured to generate information indicative of physical motion of the Internet enabled device, and wherein the control logic is further adapted to initiate transmission of the information indicative of the physical motion.

6. The Internet enabled device of claim 1, wherein the control logic is adapted to obtain the geographical location of the Internet enabled device.

7. The Internet enabled device of claim 1, wherein the unique device identifier is hardware-coded.

8. A system comprising:
   a receiver to receive one or more signals via a communication network; and
   control logic to:
   process information, received via the one or more signals, indicative of a unique identifier and a geographical location of an Internet enabled device; and
   determine whether a selection of an Internet advertisement at the Internet enabled device is authenticated, based at least in part on the processed information indicative of the unique identifier and the geographical location.

9. The system of claim 8, wherein the control logic is further adapted to decrypt the information indicative of the unique identifier and the geographical location of the Internet enabled device with a locally stored cryptographic key.

10. The system of claim 8, wherein the control logic is further adapted to
    generate an indication that the selection of the Internet advertisement is a valid click in response to the selection of the Internet advertisement being authenticated.

11. The system of claim 8, wherein the control logic is further adapted to
    generate an indication that the selection of the Internet advertisement is an invalid click in response to the selection of the Internet advertisement not being authenticated.

12. The system of claim 8, wherein the control logic is further adapted to
    indicate that the selection of the Internet advertisement is provisionally an invalid click in response to the selection of the Internet advertisement not being authenticated.

13. The system of claim 8, wherein the control logic is further adapted to
    compare the geographical location of the Internet-enabled device to a geographical area of applicability for the Internet advertisement; and
    designate the selection of the Internet advertisement as a valid click associated with the Internet advertisement in response to the geographical location of the Internet enabled device being included within the geographical area of applicability for the Internet advertisement.

14. The system of claim 13, wherein a designation of the selection of the Internet advertisement as a valid click comprises counting the click.

15. The system of claim 13, wherein the geographical location is based at least in part on at least one of: satellite positioning signals, wireless network location, IP address location, or a proxy server location.

16. The system of claim 8, wherein the control logic is further adapted to process information having at least one information type comprising at least one of: time information associated with a time of the selection of the Internet advertisement, information indicative of physical movement of the Internet enabled device, or information indicative of an IP address of the Internet enabled device.

17. The system of claim 8 wherein the information indicative of a unique identifier includes abstracted information.

18. The system of claim 8, wherein the information indicative of a unique identifier includes encrypted information encrypted with a first hardware-included key, and wherein a second locally stored key is configured to decrypt information encrypted with the first key.

19. The system of claim 8, wherein the system further includes a server associated with a service provider hosting the Internet advertisement, and wherein the control logic is included in the server.

20. A system comprising:
    means for receiving one or more signals via a communication network; and
    means for processing the information, received via the one or more signals, indicative of a unique identifier and a geographical location of an Internet enabled device; and
    means for determining whether a selection of an Internet advertisement at the Internet enabled device is authenticated based at least in part on the processed information indicative of the unique identifier and the geographical location.

21. The system of claim 20, wherein the means for processing the information indicative of the unique identifier and the geographical location comprises means for decrypting the information indicative of the unique identifier with a locally stored cryptographic key.

22. The system of claim 20, further comprising means for generating an indication that the selection of the Internet advertisement is a valid click in response to the selection of the Internet advertisement being authenticated.

23. The system of claim 20, further comprising means for generating an indication that the selection of the Internet advertisement is an invalid click in response to the selection of the Internet advertisement not being authenticated.

24. The system of claim 20, further comprising
    means for comparing the geographical location of the Internet-enabled device to a geographical area of applicability for the Internet advertisement; and
    means for designating the selection of the Internet advertisement as a valid click associated with the Internet advertisement in response to the location of the Internet-enabled device being included in the geographical area of applicability for the Internet advertisement.

25. A process for uniquely identifying an Internet enabled device with a unique device identifier, comprising:
    processing, by one or more processors, received information indicative of the unique device identifier and a geographical location of the Internet enabled device in response to the Internet enabled device selecting an Internet advertisement;

determining whether the selection of the Internet enabled device is authentic based at least in part on the information indicative of the unique device identifier; and transmitting information relating to the Internet advertisement to the Internet enabled device via a communication network in response to determining that the selection of the Internet enabled device is authentic.

26. The process of claim 25, further comprising determining whether the geographical location of the Internet enabled device is included in a geographic area of applicability of the Internet advertisement, based at least in part on the information indicative of the geographical location of the Internet enabled device.

27. The process of claim 26, further comprising, in response to the geographical location of the Internet enabled device being included in the geographic area of applicability, determining that the selection of the Internet advertisement is valid.

28. The process of claim 27, further comprising counting the selection of the Internet advertisement as a click in response to determining that the selection of the Internet advertisement is valid.

29. The process of claim 26, further comprising, in response to the geographical location of the Internet enabled device not being included in the geographic area of applicability, indicating that the selection of the Internet advertisement is not valid.

30. The process of claim 26, further comprising, in response to the geographical location of the Internet enabled device not being included in the geographic area of applicability, not counting the access of the Internet advertisement as a click.

31. The process of claim 25, wherein determining whether the selection of the Internet enabled device is authentic based at least in part on the information indicative of the unique device identifier comprises decrypting the information indicative of the unique identifier with a locally stored cryptographic key.

32. An article comprising a non-transitory computer readable medium having instructions stored thereon that are executable by a processor to:

process received information indicative of a unique device identifier and a geographical location of an Internet enabled device in response to the Internet enabled device selecting an Internet advertisement;

determine whether the selection of the Internet enabled device is authentic based at least in part on the information indicative of the unique device identifier; and initiate transmission of information relating to the Internet advertisement to the Internet enabled device via a communication network in response to determining that the selection of the Internet enabled device is authentic.

33. The article of claim 32, wherein the instructions are further executable by the processor to determine whether the geographical location of the Internet enabled device is included in a geographic area of applicability of the Internet advertisement, based at least in part on the information indicative of the geographical location of the Internet enabled device.

34. The article of claim 33, wherein the instructions are further executable by the processor to determine that the selection of the Internet advertisement is valid in response to the geographical location of the Internet enabled device being included in the geographic area of applicability.

35. The article of claim 34, wherein the instructions are further executable by the processor to count the selection of the Internet advertisement as a click in response to determining that the selection of the Internet advertisement is valid.

36. The article of claim 33, wherein the instructions are further executable by the processor to indicate that the selection of the Internet advertisement is not valid in response to the Internet enabled device not being included in the geographic area of applicability.

37. The article of claim 32, wherein the instructions are further executable by the processor to decrypt the information indicative of the unique identifier with a cryptographic key.

38. An Internet enabled device, comprising:

means for receiving an indication of a selection of a particular Internet advertisement; and means for transmitting, via a communication network, information indicative of a unique device identifier, a geographical location of the Internet enabled device, and information indicative of the selection of the particular Internet advertisement in response to receiving the indication of the selection of the particular Internet advertisement.

39. The Internet enabled device of claim 38, wherein the unique device identifier comprises a hardware-coded key.

40. The Internet enabled device of claim 38, further comprising means for encrypting the unique device identifier.

41. The Internet enabled device of claim 38, further comprising means for determining information indicative of a selection time associated with the selection of the Internet advertisement, and wherein the means for transmitting information indicative of the unique device identifier, the geographical location of the Internet enabled device, and the information indicative of the selection of the particular Internet advertisement includes means for transmitting the information indicative of the selection time.

42. The Internet enabled device of claim 38, further comprising means for generating information indicative of physical motion of the Internet enabled device, and wherein the means for transmitting information indicative of the unique device identifier, the geographical location of the Internet enabled device, and information indicative of the selection of the particular Internet advertisement includes means for transmitting the information indicative of the physical motion.

43. A process, comprising:

processing, by one or more processors, a received indication of a selection of a particular Internet advertisement; and in response to receiving the indication of the selection of the particular Internet advertisement, transmitting, via a communication network, information indicative of a unique device identifier and a geographical location of an Internet enabled device, and information indicative of the selection of the particular Internet advertisement.

44. The process of claim 43, wherein the unique device identifier comprises a hardware-coded key.

45. The process of claim 43, further comprising encrypting the unique device identifier.

46. The process of claim 43, further comprising determining information indicative of a selection time associated with selection of the Internet advertisement, and initiating transmission of the information indicative of the selection time.

47. The process of claim 43, further comprising accessing information indicative of physical motion of the Internet enabled device, and transmitting the information indicative of the physical motion.

48. An article comprising a non-transitory computer-readable medium having instructions stored thereon that are executable by a processor to process a received indication of a selection of a particular Internet advertisement; and initiate transmission, via a communication network, of information indicative of a unique device identifier and a geographical location of an Internet enabled device, and information indicative of the selection of the particular Internet advertisement in response to receiving the indication of the selection of the particular Internet advertisement.

49. The article of claim 48, wherein the instructions are further executable by the processor to determine information indicative of the geographical location of the Internet enabled device, and to initiate transmission of the information indicative of the geographical location of the Internet enabled device.

50. The article of claim 48, wherein the unique device identifier comprises a hardware-coded key.

51. The article of claim 48, wherein the instructions are further executable by the processor to encrypt the unique device identifier.

52. The article of claim 48, wherein the instructions are further executable by the processor to determine information indicative of a selection time associated with selection of the Internet advertisement, and to initiate transmission of the information indicative of the selection time.

53. The article of claim 48, wherein the instructions are further executable by the processor to access information indicative of physical motion of the Internet enabled device, and to transmit the information indicative of the physical motion.

* * * * *